United States Patent Office 3,198,829
Patented Aug. 3, 1965

3,198,829
N,N' DICYANOAMIDINES AND METHODS OF PREPARATION
John Thomas Shaw, Middlesex, N.J., assignor to American Cyanamid Company, Stamford, Conn., a corporation of Maine
No Drawing. Original application June 29, 1961, Ser. No. 120,537. Divided and this application May 14, 1962, Ser. No. 195,013
5 Claims. (Cl. 260—551)

This application is a division of application Serial No. 120,537, filed June 29, 1961, now abandoned.

This invention relates to the provision of a new class of compounds and to a process whereby they may be converted to valuable mono-N-oxides of non-melamine-s-triazines. More specifically, this invention relates to N, N'-dicyanoamidines of the formulae

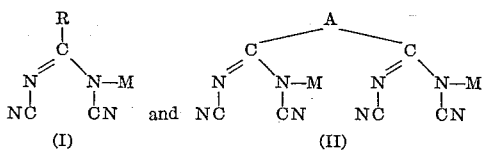

wherein M is a metal; R is hydrogen, alkyl or aryl; and A is alkylene or arylene. The R and A groups may be substituted by alkyl, alkoxy, halogen and/or nitro radicals.

In commonly assigned copending application Serial No. 108,722 filed May 9, 1961, now U.S. Patent 3,093,645, are disclosed a valuable new class of mono-N-oxides of non-melamine-s-triazines. These N-oxides were prepared by a peracid treatment of the corresponding triazine whereby a nuclear nitrogen was oxidized to give the desired N-oxide. While this method was capable of giving the desired N-oxide in good yields, it suffered the disadvantage of not being fully selective in the reaction with the triazine nitrogens. Thus, oxidative attack could be found at either the one, the three or the five position of the s-triazine nucleus. Moreover, it is a weakness of this method that a miscalculation of the ratio of the peracid reagent to the s-triazine starting material could result in the preparation of a di-N-oxide or a tri-N-oxide instead of the desired mono-N-oxide.

It is an object of this invention to provide a method and intermediates therefor by which mono-N-oxides of s-triazines can be produced without the foregoing disadvantages. It is a further object to provide a new class of compounds which in addition to being intermediates in chemical synthesis, also have utility as fungicides, germicides and metal chelating agents.

It has now been found that mono-N-oxides of s-triazines can be readily prepared by an improved method which comprises treating a compound of this invention with an hydroxylamine salt. The addition reaction proceeds according to the following equation:

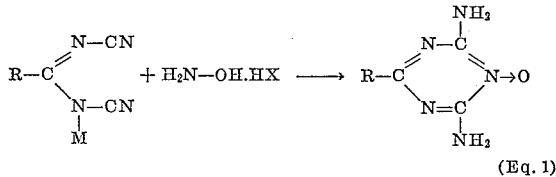

(Eq. 1)

wherein R and M are as hereinbefore defined and X is an anion of an inorganic acid (e.g. hydrochloric, sulfuric, and hydrobromic acids) or an organic acid (e.g., formic, acetic, benzenesulfonic and trichloroacetic acids).

It is an advantage of the reaction depicted by Equation 1 that neither the proportions of reactants, the nature of the reaction medium nor the temperature are critical.

Since the reaction involves one mole of each reactant, it is convenient to employ molar quantities, but an excess of either reactant may be used. Generally the reaction is conducted in an inert organic solvent since this ensures good contact between the reactants and decreases the amount of unwanted by-products from side reactions. Suitable solvents are Cellosolve, dioxane, 1,2-dimethoxyethane and ethanol. The reaction proceeds well at room temperature, but elevated or lower temperatures (i.e., in the range of 15°–100° C.) may be employed.

The product which is insoluble in the reaction mixture can be separated by filtration, and further purified in accordance with known washing and recrystallization procedures.

The compounds of this invention may be prepared by a number of methods.

In accordance with one method, an amidine is reacted with cyanogen chloride. The reaction proceeds according to the following equation:

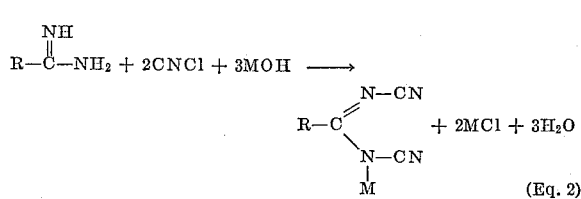

(Eq. 2)

wherein R and M are as hereinbefore defined. It should be noted that while the equation shows the reaction of a monoamidine, it represents a way to produce compounds of Formula II as well. The only adjustment necessary is in the molar ratio of reactants. When a diamidine is used, 4 moles of cyanogen chloride are employed for each mole of the amidine.

The reaction of Equation 2 is carried out in an inert organic non-polar solvent such as acetone, dioxane, or acetonitrile at a temperature below about 25° C., preferably between about 5° and 10° C. The proportions of reactants should be approximately equal to the theoretical amounts. Thus about 2 moles of cyanogen chloride and about 3 equivalents of inorganic base should be used for each amidine group to be converted.

It is an advantage of this process that any inorganic base may be used. Among the suitable materials are the alkali (e.g. sodium and potassium) and alkaline earth (e.g. calcium and magnesium) metal hydroxides or carbonates.

The amidines may be employed as such or in the form of salts with non-oxidizing acids such as hydrochloric, sulfuric, acetic and phosphoric acids. Among the suitable amidines are formamidine; alkyl amidines such as acetamidine, trichloroacetamidine, propionamidine, n-butyramidine, heptafluorobutyramidine, iso-butyramidine, caprylamidine, perfluorocaprylamidine, lauramidine and stearamidine; diamidines of saturated dibasic carboxylic acids such as malonamidine, succinamidine, adipamidine, suberamidine and sebacamidine; and arylamidines of less than three 6-membered rings such as benzamidine, alpha-naphthamidine, beta-naphthamidine, p-nitrobenzamidine, o-chlorobenzamidine, toluamidine, and terephthalamidine. In general, the useful amidines are alkylamidines and diamidines of no more than eighteen carbon atoms or arylamidines and diamidines of less than three 6-membered rings which may be substituted by halo, nitro, alkyl and/or alkoxy radicals.

Alternatively, the compounds of Formulas I and II may be prepared by the reaction of an alkali or alkaline earth metal cyanamid with an imidate. This procedure is primarily useful for the preparation of aliphatic dicyanoamidines since, in practice, the aromatic imidate esters under the reaction conditions enter into side reactions to yield unwanted by-products such as benzoguanamines.

The reaction is represented by the following equation:

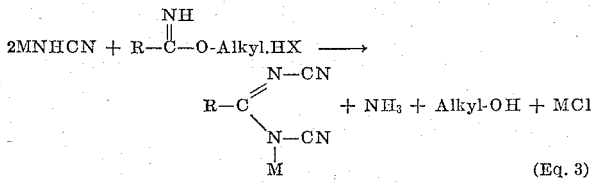

(Eq. 3)

wherein M, R and X are as hereinbefore defined using the reactants in approximately theoretical proportions.

The reaction is conducted at mildly elevated temperatures generally below about 70° C. and preferably at about 50° to 60° C. in an inert polar organic solvent such as dimethylsulfoxide, methanol and ethanol. The insoluble product may be separated and purified by known procedures.

The alkyl imidates, which may be used as their salts (e.g. the hydrochlorides), include methyl formimidate, methyl acetimidate, ethyl acetimidate, ethyl propionimidate, ethyl butrimidate, methyl valerimidate, methyl lactimidate, ethyl laurimidate, diethyl succinimidate, dimethyl adipimidate, methyl heptafluorobutyrimidate, methyl glyoxylimidate diethyl acetal. In general there are alkyl monoimidates and diimidates of no more than eighteen carbon atoms which may be substituted by halo and alkoxy radicals.

The compounds of this invention, in addition to being intermediates are also useful fungicides and bacteriocides as shown by their ability to inhibit the growth of *Staphylococcus aureus*, *Trichophyton mentagrophytes* and *Microsporum gypseum*. They find further utility because of their ability to chelate heavy metals such as copper and iron. As chelating agents, they may be used to extract heavy metals from solutions containing them either for the purpose of recovering the heavy metals or purifying the solutions.

The following examples in which parts are on a weight basis are presented for the purpose of illustrating this invention.

EXAMPLE 1

*Sodium N,N'-dicyanoacetamidine*

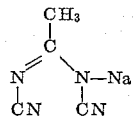

To a stirred solution of 123.4 parts (1.0 mole) of ethyl acetimidate hydrochloride in 400 parts anhydrous methanol, add 168.5 parts (2.2 moles) of 83.5% sodium acid cyanamide. While passing a gentle stream of nitrogen through the system, the reaction mixture is refluxed for about 24 hours or until the evolution of ammonia ceases. The solvent is allowed to evaporate at room temperature and the residue then dried at 60° C. About 114 parts of pale yellow material giving a green precipitate with aqueous copper sulfate are obtained.

The sodium dicyanoacetamidine is purified by dissolving it in an approximately equal amount of water, cooling, filtering, evaporating the filtrate to dryness and recrystallizing the residue from an ethanol-ether mixture. The product melts at about 262–263° C. with decomposition.

*Analysis.*—Calcd. for $C_4H_3N_4Na$: C, 36.9; H, 2.31; N, 43.3; Na, 17.7. Found: C, 36.8; H, 2.45; N, 43.3; Na, 16.7.

Substitution of an equivalent quantity of ethyl trichloroacetimidate hydrobromide for the imidate used in the foregoing procedure gives the product sodium N,N'-dicyanotrichloroacetamidine.

The corresponding calcium salt is obtained when calcium acid cyanamid is used in place of sodium acid cyanamid.

EXAMPLE 2

*Potassium N,N'-dicyanoacetamidine*

To a slurry of 47.2 parts (0.5 mole) of acetamidine hydrochloride in 400 parts of acetone at between —20° and —30° C., is added 56 parts (1.0 mole) of potassium hydroxide. After stirring for 20 minutes at between —20° and —5° C., 30.7 parts (0.5 mole) of cyanogen chloride gas are introduced through a tube to a point just above the surface of the reaction mixture over a period of about 1 hour while keeping the temperature between 5° and 10° C. After cooling to —20° C., 56 parts of KOH and then 160 parts of acetone are added. 30.7 parts of cyanogen chloride gas are then introduced over a period of one hour while keeping the temperature at about 7° C. When the pH of the reaction mixture has been adjusted to between 6.8 and 7.2 with acetic acid, the mixture is filtered and the solvent distilled in vacuo. The product, after slurrying with isopropyl alcohol, has the same infrared spectra as the product of Example 1.

*Analysis.*—Calcd. for $C_4H_3N_4K$: N, 38.4. Found: N, 38.4.

If perfluorocaprylamidine hydrochloride is used in the foregoing procedure, there is obtained the product potassium N,N'-dicyano-perfluorocaprylamidine.

Similarly, substitution of formamidine hydrochloride for acetamidine hydrochloride in the foregoing procedure results in the formation of potassium N,N'-dicyanoformamidine.

EXAMPLE 3

*Sodium N,N'-dicyanopropionamidine*

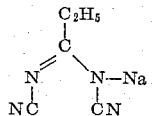

A slurry of 29.9 parts (0.39 mole) of 83.5% sodium acid cyanamid in 80 parts of methanol is cooled to 5–10° C., and 30.8 parts (0.2 mole) of ethyl propionimidate hydrochloride is added in one portion. The mixture is stirred at 0–10° C. for 15 minutes, and then at 53–57° C. for about 24 hours, while passing a stream of nitrogen through the system. After cooling, the reaction mixture is filtered and the filtrate evaporated at room temperature and then in vacuo at 55–60° C. to a thick slurry. The solids are separated by filtration, and washed with isopropyl alcohol and ether. The white product, about 21 parts, melts at about 178–179° C. and gives a green precipitate with aqueous copper sulfate. The product is purified by crystallization from isopropyl alcohol, M.P. 201–202° C.

*Analysis.*—Calcd. for $C_5H_5N_4Na$: C, 41.8; H, 3.48; N, 39.1. Found: C, 41.8; H, 3.67; N, 38.7.

EXAMPLE 4

*Potassium N,N'-dicyanolauramidine*

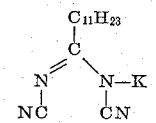

To a slurry of 23.4 parts (0.1 mole) of lauramidine hydrochloride and 120 parts of acetone at —20° C., is added 13.2 parts (0.2 mole) of 85% powdered potassium hydroxide. After stirring for about 10 minutes at —20° C., 6.1 parts (0.1 mole) of cyanogen chloride is introduced at a point just above the surface of the liquid while keeping the temperature between 7° and 9° C. At the end of the addition, the reaction mixture has a pH of about 8. After cooling to —20° C., add 15.2 parts (0.2 mole) of 85% powdered potassium hydroxide, followed by a stirring period of 20 minutes at the same temperature. The introduction of 6.1 parts (0.1 mole) of cyanogen chloride is then continued at about 3° C. When the reaction mixture becomes too thick to stir adequately about 170 parts of acetone is added and the pH of the reaction mixture is adjusted to about 8. The stirring is continued at 0–15° C. for 1 hour and then approximately 0.5 part of glacial acetic acid is added to give a pH between 4 and 5. Filtration of the reaction mixture gives a product which after purification by crystallization from water, melts at 196° C. and gives a green precipitate with aqueous copper sulfate.

*Analysis.*—Calcd. for $C_{14}H_{23}N_4K$: C, 58.6; H, 8.11; N, 19.6. Found: C, 58.8; H, 8.04; N, 19.4.

EXAMPLE 5

*Dipotassium N,N',N'',N'''-tetracyanoadipoamidine*

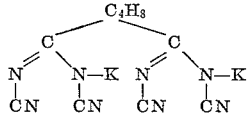

A slurry of 21.5 parts (0.1 mole) of adipamidine hydrochloride in 240 parts of acetone is cooled to −20° C. and 26.4 parts (0.4 mole) of 85% powdered potassium hydroxide is added. After the reaction mixture is stirred at −20° to 0° C. for about 25 minutes, 12.2 parts (0.2 mole) of cyanogen chloride is added over a period of about 30 minutes. At −20°, 80 parts of acetone and 24.6 parts (0.4 mole) of 85% powdered potassium hydroxide are added and the reaction mixture stirred for about 10 minutes at −5 to −20° C. 16.1 parts of cyanogen chloride is added at 6–9° C., and the reaction mixture stirred for 1 hour at 0–10° C. Acetic acid is then added to obtain a pH of 5–6. The reaction mixture is filtered, the filter cake washed with acetone, and the filtrate is distilled in vacuo to obtain a residual slurry. The slurry is stirred with 120 parts of isopropyl alcohol, chilled and filtered. The product can be purified by crystallization from an ethanol-ether mixture. The product melts at 260–262° C. with decomposition and gives a green precipitate with aqueous copper sulfate.

*Analysis.*—Calcd. for $C_{10}H_8N_8K_2$: C, 37.7; H, 2.54; N, 35.2. Found: C, 38.0; H, 2.54; N, 35.2.

Substitution of the hydrochlorides of malonamidine and sebacamidine in the foregoing procedure results in the preparation of the corresponding tetracyanodiamidines.

EXAMPLE 6

*Potassium N,N'-dicyanobenzamidine*

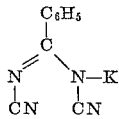

A slurry of 13.7 parts (0.712 mole) of benzamidine hydrochloride dihydrate in 80 parts of acetone is cooled to −20° C., and 9.36 parts (0.142 mole) of 85% powdered potassium hydroxide is added. After stirring at −15 to 0° C. for about 15 minutes, 4.4 parts (0.0712 mole) of cyanogen chloride gas is introduced just above the surface of the slurry over a period of about 20 minutes. The mixture is cooled to about −20° C. and 9.36 parts (0.142 mole) of 85% powdered potassium hydroxide and 50 parts of acetone are added. It is stirred for about 10 minutes at −10° C. to 0° C., and 6.7 parts (0.109 mole) of cyanogen chloride are added at a temperature of 7–9° C. over a period of about 30 minutes. The reaction mixture is stirred for 1 hour at 0–15° C., and the pH adjusted to 6–7 with acetic acid. The orange-yellow slurry is filtered at −5 to −10° C., and the cake washed with acetone. The filtrate is concentrated in vacuo, and the resulting solution is stirred with ethyl acetate and ether to give a precipitate which is separated by filtration, washed with ether and dried in vacuo at 45° C. The product, after purification by crystallization from isopropyl alcohol, melts at 245–247° C., and gives a green precipitate with aqueous copper sulfate.

*Analysis.*—Calcd. for $C_9H_5N_4K$: C, 51.9; H, 2.42; N, 26.9. Found: C, 51.8; H, 2.68; N, 26.8.

By the substitution of terephthalamidine hydrochloride and the use of twice the amount of cyanogen chloride and potassium hydroxide there is obtained potassium N,N',N'',N'''-tetracyanoterephthalamidine.

EXAMPLE 7

*Potassium N,N'-dicyano-p-chlorobenzamidine*

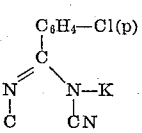

A slurry of 47.7 parts (0.25 mole) of p-chlorobenzamidine hydrochloride in 550 parts of acetone is cooled to −20° C., and 31.9 parts (0.485 mole) of 85% powdered potassium hydroxide is added. The mixture is stirred for about 30 minutes at −20 to −10° C., and 14.1 parts (0.23 mole) of cyanogen chloride gas is introduced over 1 hour at a point just above the surface of the reaction mixture. The temperature is maintained at 5–10° C. About 160 parts of acetone is added during the addition of the cyanogen chloride gas to maintain a stirrable mixture. 33.9 parts (0.515 mole) of 85% powdered potassium hydroxide is added at −20° C. An additional 19.2 parts (0.312 mole) of cyanogen chloride is added during a 1 hour period at 7–9° C., the reaction mixture stirred for 1 hour at 10–15° C., and then acidified at 5° C. with acetic acid to a pH of 6–7. The slurry is filtered and washed with acetone. The filtrate is concentrated in vacuo, and the residual slurry is treated with 525 parts of ether. The mixture is chilled and filtered to give a product which, after recrystallization from isopropyl alcohol, melts at about 308–310° C.

*Analysis.*—Calcd. for $C_9H_4N_4ClK$: C, 44.6; H, 1.6; N, 22.0; Cl, 14.6. Found: C, 44.8; H, 1.58; N, 22.7; Cl, 14.6.

The corresponding N,N'-dicyano-p-nitrobenzamidine, -p-toluamidine and -p-methoxybenzamidine are obtained when the p-nitro-, p-methyl- and p-methoxybenzamidine hydrochlorides are substituted in the procedures of Example 7.

EXAMPLE 8

*Copper salt of N,N'-dicyanoacetamidine*

A solution of 13.0 parts (0.1 mole) of sodium N,N'-dicyanoacetamidine (product of Example 1) in 15 parts of water is treated with a solution of 24.8 parts (0.1 mole) of copper sulfate pentahydrate dissolved in 50 parts of water. The slurry is stirred for 1 hour at room temperature, and the green precipitate is separated by filtration. Analysis of the dry product indicates that 2 moles of dicyanoacetamidine are associated with each copper atom.

*Analysis.*—Calcd. for $C_8H_6N_8Cu \cdot 2H_2O$: C, 30.7; H, 3.19; N, 35.7. Found: C, 30.4; H, 2.83; N, 35.4.

EXAMPLE 9

*2,6-diamino-4-methyl-s-triazine 1-oxide*

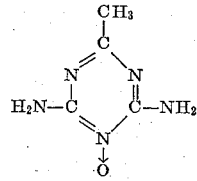

A solution of 4.38 parts (0.03 mole) of potassium N,N'-dicyanoacetamidine (product of Example 2) in about 30 parts of Cellosolve is treated with 2.09 parts (0.03 mole) of hydroxylamine hydrochloride. The reaction mixture is stirred at room temperature for about 3 days. After cooling in an ice bath, the precipitate is filtered off and slurried in 25 parts of water. The product, after filtration and drying at 60° C., gives a deep red color with ferric chloride and melts at a temperature above 330° C. The infrared spectrum agrees with that of an authentic sample of 2,6-diamino-4-methyl-s-triazine 1-oxide, prepared by the peracetic acid oxidation of acetoguanamine.

Analysis.—Calcd. for $C_4H_7N_5O$: C, 34.1; H, 4.98; N, 49.7. Found: C, 34.4; H, 5.18; N, 49.5

The sodium salt of N,N'-dicyanoacetamidine may be used in place of the potassium salt.

EXAMPLE 10

*2,6-diamino-4-ethyl-s-triazine 1-oxide*

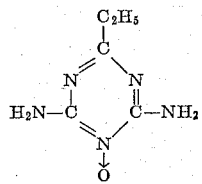

To a solution of 2.2 parts (0.0154 mole) of sodium N,N'-dicyanopropionamide in about 15 parts of Cellosolve is added 1.61 parts (0.0232 mole) of hydroxylamine hydrochloride. The reaction mixture is stirred at room temperature for about 4 days, cooled in an ice bath and filtered. The filter cake is stirred with about 10 parts of water, and the insoluble material is filtered off and dried. The product, after crystallization from a 50:50 mixture of Cellosolve and water, melts at 307° C. with decomposition and gives a deep red color with ferric chloride. The infrared spectrum of this product is identical with that of an authentic sample of 2,6-diamino-4-ethyl-s-triazine 1-oxide, prepared by the peracetic acid oxidation of propioguanamine.

Analysis.—Calcd. for $C_5H_9N_5O$: C, 38.7; H, 5.86. Found: C, 39.0; H, 6.14.

EXAMPLE 11

*2,6-diamino-4-undecyl-s-triazine 1-oxide*

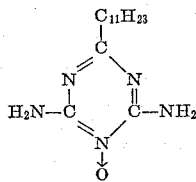

To a slurry of 3.04 parts (0.01 mole) of potassium N,N'-dicyanolauramidine in about 15 parts of Cellosolve is added 1.04 parts (0.015 mole) of hydroxylamine hydrochloride. The reaction mixture is stirred at room temperature for about 5 days, cooled in an ice bath and filtered. The filter cake is stirred with 25 parts of water. The product, obtained by filtration and drying, may be crystallized from methanol. It melts at 251–253° C. with decomposition and gives a deep red color with ferric chloride in methanol. The infrared spectrum is identical with that of an authentic sample of 2,6-diamino-4-undecyl-s-triazine 1-oxide, prepared by the oxidation of lauroguanamine with peracetic acid.

Analysis.—Calcd. for $C_{14}H_{27}N_5O$: C, 59.8; H, 9.66; N, 24.9. Found: C, 60.1; H, 10.0; N, 24.6.

EXAMPLE 12

*2,6-diamino-4-phenyl-s-triazine 1-oxide*

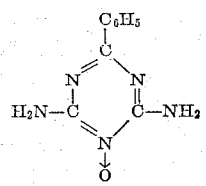

To a solution of 2.0 parts (0.01 mole) of potassium N,N'-dicyanobenzamidine in 10 parts of Cellosolve is added 1.04 parts (0.015) mole) of hydroxylamine hydrochloride. The reaction mixture is stirred at room temperature for about 2 days and is then evaporated in vacuo to dryness. The residue is stirred with about 20 parts of water, and the insoluble material is filtered and dried at room temperature. After purification by slurrying in aqueous sodium hydroxide followed by the addition of acetic acid to a pH of 4 and filtration, the product melts at 278–279° C. and gives a deep red color with ferric chloride.

Analysis.—Calcd. for $C_9H_9N_5O$: C, 53.3; H, 4.44, N, 34.5. Found: C, 53.4; H, 4.74; N, 34.6.

EXAMPLE 13

*2,6-diamino-4-p-chlorophenyl-s-triazine 1-oxide*

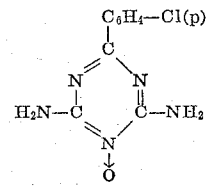

To a solution of 2.42 parts (0.01 mole) of potassium N,N'-dicyano-p-chlorobenzamidine in 10 parts of Cellosolve is added 1.39 parts (0.02 mole) of hydroxylamine hydrochloride. The reaction mixture is stirred at room temperature for about 4 days, and the precipitate is separated by filtration and stirred with 35 parts of water. Filtration gives a product which, after crystallization from a mixture of Cellosolve and water, melts at 272–274° C.

Analysis.—Calcd. for $C_9H_8N_5ClO$: C, 45.6; H, 3.37; N, 29.5. Found: C, 45.4; H, 3.33; N, 29.3.

EXAMPLE 14

By the agar dilution method, the minimum inhibitory concentration of potassium N,N'-dicyanolauramidine toward *Staphylococcus aureaus* is 31 micrograms/ml.

The minimum inhibitory concentration of potassium N,N'-dicyanolauramidine toward the fungi, *Trichophyton mentagrophytes* and *Microsporum gypseum*, is 62 micrograms/ml.

I claim:

1. A compound selected from the group consisting of

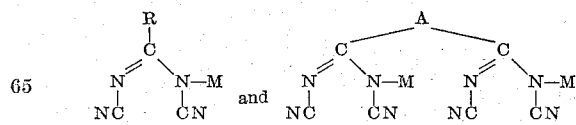

wherein M is a metal selected from the group consisting of alkaline earth metals, alkali metals and copper; R is a member selected from the group consisting of hydrogen, alkyl of up to 18 carbons and carbocyclic aryl of less than three 6-membered rings; and A is a member selected from the group consisting of alkylene of up to 18 carbons and carbocyclic arylene of less than three 6-membered rings.

2. Sodium N,N'-dicyanoacetamidine.
3. Potassium N,N-dicyanolauramidine.
4. Potassium N,N-dicyanobenzamidine.
5. Dipotassium N,N',N'',N'''-tetracyanoadipamidine.

References Cited by the Examiner
UNITED STATES PATENTS

| | | | |
|---|---|---|---|
| 2,049,582 | 8/36 | Ziegler | 260—564 |
| 2,371,100 | 3/45 | Kaiser et al. | 260—564 |
| 2,566,862 | 9/52 | Studeny | 260—564 |
| 2,729,640 | 1/56 | Kaiser et al. | 260—249.6 |

OTHER REFERENCES

Gaerdler et al.: Ber. Deut. Chem., Vol. 86, pp. 890–894 (1953).

Houben-Weyl: "Methoden der Organischen Chemie," Band VIII, pages 212 to 213, Georg Thieme Verlag, Stuttgart, Germany (1952).

WALTER A. MODANCE, *Primary Examiner.*

CHARLES B. PARKER, JOHN D. RANDOLPH, *Examiners.*